United States Patent Office 3,479,341
Patented Nov. 18, 1969

3,479,341
AMIDINOHYDRAZONES OF 4-HALO-3-KETO-STEROIDS AND INTERMEDIATES
Kurt W. Ledig, Philadelphia, and Gerhard R. Wendt, Havertown, Pa., assignors to American Home Products Corporation, New York, N.Y., a corporation of Delaware
No Drawing. Filed Jan. 23, 1968, Ser. No. 699,793
Int. Cl. C07c *173/00, 169/08, 167/26*
U.S. Cl. 260—239.55       13 Claims

ABSTRACT OF THE DISCLOSURE 4-halo-13-alkyl-17α-substituted-17 -hydroxygon-4-en-3-one, amidinohydrazones, and 17-esters thereof and their salts (I) are prepared by condensing the corresponding 4-halo-13-alkyl-17α-substituted-17 -hydroxygon-4-en-3-one (II) with a salt of an aminoguanidine (III). Compounds of Formula I are pharmacologically active, antimicrobially, especially against bacteria, protozoa and amebae.

---

This invention relates to steroidal compounds with valuable pharmacological properties. More particularly it is concerned with novel amidinohydrazones of 4-halo-3-ketosteroids and their salts, which are antimicrobial agents, especially active against pathogenic bacteria, protozoa (e.g., trichomonas) and amebae.

DESCRIPTION OF THE INVENTION

The compounds of this invention are selected from a compound of Formula I:

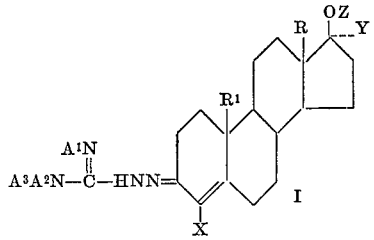

wherein:

R is (lower) alkyl;
$R^1$ is hydrogen or methyl;
X is fluoro, chloro or bromo;
Y is (lower)alkyl, (lower)alkenyl, (lower)alkylnyl, chloroethynyl, 3-hydroxypropynyl or carboxyethynyl;
Z is hydrogen, (lower)alkanoyl or benzoyl;
$A^1$ and $A^2$, independently, are hydrogen or (lower)alkyl or, taken together, are —$CH_2CH_2$—; and $A^3$ is hydrogen, nitro, (lower)alkyl, di(lower)alkylamino(lower)alkyl hexamethyleneimino(lower)alkyl, heptamethyleneimino(lower)alkyl or octamethyleneimino(lower)alkyl, provided however that when $A^1$ and $A^2$ taken together are —$CH_2CH$—, $A^3$ is hydrogen, or a pharmaceutically-acceptable acid-addition salt of said compound.

Special mention is made of several particularly valuable embodiments of the instant invention. These are:

4-chloro-13-ethyl-17α-ethynyl-17 -hydroxygon-4-en-3-one, amidinohydrazone, a compound of Formula I wherein R is ethyl, X is chloro, Y is ethynyl, and $R^1$, Z, $A^1$, $A^2$ and $A^3$ are hydrogen, and especially the monohydrated nitric acid-addition salt thereof;

4-chloro-13, 17α-diethyl-17 -hydroxygon-4-en-3-one, amidinohydrazone, a compound of Formula I wherein R and Y are ethyl, X is chloro and $R^1$, Z, $A^1$, $A^2$ and $A^3$ are hydrogen, and especially the nitric acid-addition salt thereof;

4-bromo-13-ethyl-17α-ethynyl-17 -hydroxygon-4-en-3-one, amidinohydrazone, a compound of Formula I wherein R is ethyl, X is bromo, Y is ethynyl and $R^1$, Z, $A^1$, $A^2$ and $A^3$ are hydrogen, and especially the monohydrated nitric acid-addition salt thereof;

4-chloro-17β-hydroxy-13,17 dipropylgon-4-en - 3 - one, amidinohydrazone, a compound of Formula I wherein R and Y are propyl, X is chloro and $R^1$, Z, $A^1$, $A^2$ and $A^3$ are hydrogen, and especially the nitric acid-addition salt thereof.

Also contemplated by the instant invention are compounds of Formula IVa:

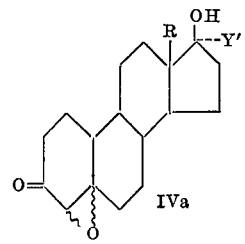

wherein:

R is polycarbonalkyl of from about 2 to about 6 carbon atoms; and
Y' is (lower)alkyl, (lower)alkynyl, chloroethynyl, 3-hydroxypropynyl or carboxyethynyl.

These compounds, as will be shown later, are valuable intermediates in an important route to obtain the new therapeutically useful compounds of Formula I. Especially valuable for this purpose are 4ξ, 5ξ-epoxido-13-ethyl-17α-ethynyl-17-hydroxygonan-3-one, a compound of Formula IVa wherein R is $CH_3CH_2$ and Y' is HC≡C; 4ξ, 5ξ-epoxido-13α,17α-diethyl-17-hydroxygonan-3-one, a compound of Formula IVa wherein R and Y' are $CH_3CH_2$; and 4ξ,5ξ-epoxido-17β-hydroxy-13,17-dipropylgonan-3-one wherein R and Y' are propyl.

When used herein and in the appended claims, the term "(lower)alkyl" contemplates saturated hydrocarbon radicals, straight and branched chain, having from 1 to about 6 carbon atoms. Illustrative (lower)alkyl radicals therefore are methyl, ethyl, n-propyl, i-propyl, n-butyl, i-butyl, n-pentyl, n-hexyl, and the like. The term "(lower)alkenyl" contemplates hydrocarbon radicals of from about 2 to about 3 carbon atoms containing one olefinic carbon-to-carbon double bond. Illustrative (lower)alkenyl groups therefore are vinyl and allyl, and the olefinic unsaturation in group Y is located at the carbon atom attached to the 17-position. The term "(lower)alkynyl" contemplates hydrocarbon radicals of from about 2 to about 3 carbon atoms containing acetylenic carbon-to-carbon triple bond. Illustrative (lower)alkynyl groups therefore are ethynyl and propynyl, and the unsaturation in group Y is located at the carbon atom attached to the 17-position. The term "(lower)alkanoyl" contemplates radicals derived from aliphatic organic acids, straight chain, branched chain and cyclic, containing from about 1 to about 8 carbon atoms.

Illustrative (lower)alkanoyl groups therefore are formyl, acetyl, n-propionyl, n-butyroyl, i-butyroyl, n-pentaonyl, n-hexanoyl, 3-methylpentanoyl, n-octanoyl, cyclopentanecarbonyl, β-cyclopentylpropionyl and the like. Especially preferred is the acetyl group. Since, as will be apparent to those skilled in the art, the amidinohydrazones of Formula I are basic in nature, they react with organic and inorganic acids in methods well known to form pharmaceutically-acceptable acid-addition salts. These salts with, for example, fumaric acid, malic acid, citric acid, tartaric acid, embonic acid, acetic acid, hydrochloric acid, sulfuric acid, and the like, comprise useful embodiments of the instant invention, especially where dosage forms of enhanced solubility, crystallinity, etc., are desired.

The compounds of Formula I can be obtained in a number of ways. One especially convenient method comprises:

(a) condensing a 4-halogon-4-en-3-one of Formula II:

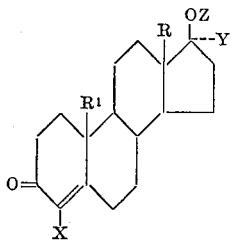

wherein R, R¹, X, Y and Z are as above defined, with an aminoguanidine salt of Formula III

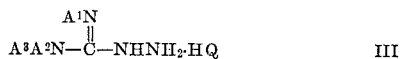

wherein A¹, A² and A³ are as above defined and Q is the anion of an organic or inorganic acid, such as the chloride, iodide, bromide, nitrate, acid sulfate, acetate, and the like, anions and preferably the nitrate anion to form the correspondingly-substituted 3-amidinohydrazone salt; and (b) if desired, liberating the corresponding free base of Formula I from the salt formed in Step (a).

The 4-halogon-4-en-3-one compounds of Formula II can be obtained in a number of ways. One especially convenient method comprises: reacting the corresponding 4,5-epoxidogonan-3-one of Formula IV:

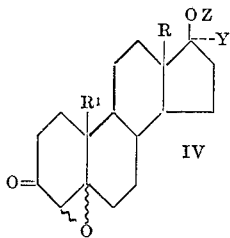

wherein R, R¹, Y and Z are as above defined and the wavy line (ξ) indicates α- or β- configuration, with a hydrohalic acid, HX, wherein X is as above defined until formation of the compound of Formula II is substantially complete.

The 4,5-epoxidogonan-3-ones of Formula IV can be prepared in a number of ways. One especially convenient method comprises: reacting the corresponding gon-4-en-3-one of Formula V:

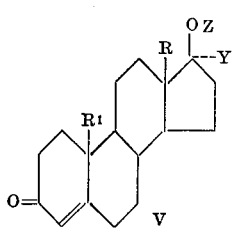

wherein R, R¹, Y and Z are as above defined, with an epoxidizing agent, such as a percarboxylic acid, for example, perbenzoic acid or monoperphthalic acid or, alternatively, alkaline hydrogen peroxide until formation of the 4,5-epoxidogonan-3-one of Formula IV is substantially complete. Compounds of Formula IVa are most useful as substrates.

The first above mentioned condensation process is run under conditions which are not particularly critical. The gon-4-en-3-one of Formula II is treated with a salt of an aminoguanidine of Formula III. The aminoguanidines used in the preparation of the compounds of this invention are known compounds either available commercially or prepared by processes well known to those skilled in the art. For example, the 1-(lower)alkyl-3-aminoguanidines, the 1,1-di(lower)alkyl-3-aminoguanidines and the 1,2-di(lower)alkyl-3-aminoguanidines can be prepared by the process described in J. Med. Chem., 6, 283 (1963); the 2-(2-imidazolin-2-yl)hydrazine (a cyclic aminoguanidine) may be prepared by the process described in J. Org. Chem., 18, 790 (1953); the 1-[di(lower)alkylamino-(lower)alkyl]-3-aminoguanidines can be prepared by the process described in J. Med. Chem., 7, 493 (1964; and the 1 - [hexamethyleneimino(lower)alkyl]-3-aminoguanidines, the 1-[heptamethyleneimino(lower)alkyl]-3-aminoguanidines and 1-[octamethyleneimino(lower)alkyl]-3-aminoguanidines can be prepared by the process described in Bull. Soc. Chem. France, 561 (1962). In one manner of proceeding, to a solution of 1 part by weight of an aminoguanidine salt, such as the nitrate, in about 70 parts by weight of an inert solvent, such as a (lower)alkanol, e.g., methanol, is added an equal part by weight, based on the aminoguanidine salt, of the 4-halogon-4-en-3-one of Formula II.

The reaction mixture is rendered acidic, such as by the addition of dilute, e.g., 7%, nitric acid and the reaction mixture is stirred for about 12 hours at a temperature of about 20–25° C., during which formation of the corresponding salt of Formula I is substantially complete. The product can be recovered in any conventional manner. Usually it will precipitate from the mixture under the above-outlined conditions. If it does not, the mixture can be concentrated, whereupon the product will precipitate, or the mixture can be evaporated to dryness leaving the product as a residue. If desired, it can be purified by recrystallization from a solvent, such as a lower alcohol, especially methanol. If a particular acid addition salt is desired, it can be obtained directly from the condensation process by using the corresponding salt of the aminoguanidine. Alternatively one salt can be converted to another by entirely conventional techniques such as, for example, liberating the free base amidinohydrazone of Formula I from one salt by treatment with a strong base, such as sodium hydroxide, then conversion of the said free base into the other, desired, salt by methods to be exemplified in detail hereinafter.

The conversion of the gon-4-en-3-ones of Formula V into the corresponding 4,5-epoxidogonan-3-ones of Formula IV and subsequently into the 4-halogon-4-en-3-ones of Formula II are carried out under reaction conditions which are not particularly critical. In one manner of proceeding, the gon-4-en-3-one of Formula V can be dissolved or suspended in about 25 parts by weight of an inert solvent, such as a (lower)alcohol, e.g., methanol, then treated dropwise and successively at a low temperature, e.g., 0° C. to 10° C. with 4 parts by weight of 35% hydrogen peroxide and 1.6 parts by weight of a moderately concentrated base, e.g., 10% sodium hydroxide solution, then holding the mixture for about one-half hour, during which formation of the compound of Formula IV is substantially complete. The compound of Formula IV can be recovered by any conventional technique. For example, the reaction mixture can be poured into water, extracted with a water-immiscible organic solvent, such as ethyl acetate, and, after drying with an agent such as anhydrous sodium sulfate, and evaporating the solvent, the compound of Formula IV remains as a residue. It can be purified if desired by chromatography or by recrystallization, but usually is sufficiently pure to be converted into the corresponding 4-halogon-4-en-3-one of Formula II. This is accomplished, for example, by dissolving the epoxide in about 40 parts by weight of an inert solvent, such as acetone, then adding from about 1 to about 5 parts by weight (based on the steroid) of the corresponding concentrated hydrohalic acid, e.g., hydrochloric, or hydrobromic acid or hydrofluoric acid-tetrahydrofuran complex in chloroform. The mixture is stirred for from about one-half to about 5, preferably about 2, hours at moderate temperatures, e.g., about 10° C. to about 50° C., during which time formation of the 4-halogen-4-en-3-one has been substantially completed. The product can be recovered by any conventional method. One means comprises pouring the reaction mixture over brine, and extracting the organic material with a water-immiscible solvent, such as ether or methylene chloride. Evaporation of the solvent leaves the compound of Formula II as a residue which may, if desired, be purified by recrystallization, e.g., from a mixture of ethyl acetate and hexane or from methanol and water, or by chromatography.

The gon-4-en-3-ones of Formula V, used as starting materials, are readily available or can easily be prepared by techniques known to those skilled in the art. Especially useful starting materials of Formula V are described in the following: J. Am. Chem. Soc., 78, 3540 (1956); U.S. 2,885,398 and 2,953,582; Can. J. Chem., 37, 1785 (1959); J. Org. Chem., 21, 1432 (1956); J. Chem. Soc., 627 (1956); and Farmaco (Pavia), Ed. Sci., 13, 52 (1958) [CA. 52:13768 i]. Especially useful techniques comprising total syntheses particularly useful to provide compounds of Formula V wherein R is (lower)alkyl are described by Gordon Alan Hughes and Herchel Smith in U.S. patent application, Ser. No. 337,823, filed Jan. 15, 1964.

Of course, as will be obvious to those skilled in the art after reviewing the above disclosure, other means to prepare compounds of Formula I will suggest themselves. For example, compounds of Formula I wherein Z is acyl can be prepared by esterifying a corresponding 17-β-ol group with an acylating agent, for example an acyl halide or acyl anhydride or an acyl p-toluene sulfonate or any obvious chemical equivalent thereof. Furthermore, compounds of Formula I wherein Y represents (lower)alkyl or (lower)alkenyl can be prepared from the corresponding (lower)alkynyl compound by partial or total reduction with hydrogen and a catalyst in accordance with well-known techniques. And these optional steps should be conducted before condensation with the aminohydrazine salt without departing from the spirit or scope of the invention described herein.

Furthermore, the time and temperature ranges used in describing the aforementioned process steps simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time, although purity of the product may be somewhat decreased.

The sources for the starting materials of Formula V have been specified hereinabove. Generally, all can be prepared by totally synthetic processes described by Douglas, Graves, Hartley, Hughes, McLoughlin, Sidall and Smith in J. Chem. Soc., 1963, pages 5077–94 and by H. Smith, Hughes, Douglas, Wendt, Buzby, Jr., Edgren, Fisher, Foell, Gadsby, Hartley, Herbst, Jansen, Ledig, McLoughlin, McMenamin, Pattison, Phillips, Rees, Sidall, Siuda, L. Smith, Tokolics and Watson in J. Chem. Soc., 1964, pages 4472–92. In the product of a total synthesis which has not included a suitable resolution stage the compounds prepared by the invention will be present as racemates. Using a convention approved by Fieser and Fieser, "Steroids," p. 336 (1959), the compounds designated as the d-forms are the enantiomers corresponding in configuration to that of the natural hormones. The corresponding enantiomorphs are consequently designated the l-forms and the racemates the dl-forms. Racemates will be depicted by structural formulas which show only the enantiomorphs of the d-configuration.

As has been mentioned hereinabove, the new amidinohydrazones of 4-halo-3-ketosteroids and their salts of Formula I are pharmacologically active, especially as antimicrobial agents. Furthermore they exhibit in vitro activity against pathogenic bacteria, protozoa (e.g., trichomonas) and amebae. This makes them useful in the treatment of conditions in mammals, such as valuable domestic animals and in laboratory animals, such as mice, rats and the like responsive to treatment with antimicrobial agents, such as infections. Furthermore, the instant compounds are of particular value for such purposes because they are well tolerated, exhibit excellent response, have a rapid onset of action, long lasting effect and low toxicity. In addition, because of their antimicrobial activity, they can be formulated into a number of biocidially active compositions, such as tooth paste, cold cream, tooth powder, antiseptic lozenges, sun-tan cream, hair rinse, liquid shampoos, industrial cleaning compositions, and the like.

When used pharmaceutically, the compounds of this invention can be administered alone or in combination with pharmaceutically-acceptable carriers, the proportion of which is determined by the solubility and chemical nature of the compound, selected route of administration and standard pharmaceutical practice. For example, they may be administered orally in the form of tablets or capsules containing such excipients as starch, milk sugar, certain types of clay, and the like. They may be administered sublingually in the form of troches or lozenges in which the active ingredient is mixed with sugar and corn syrups, flavoring agents and dyes; and then dehydrated sufficiently to make the mixture suitable for pressing into solid, compact form. They may be administered orally in the form of suspensions which may contain coloring and flavoring agents of they may be injected parenterally, that is intramuscularly, intravenously or subcutaneously. For parenteral administration they may be used in the form of a sterile suspension containing other solutes, for example, enough saline or glucose to make the suspension isotonic. They can also be used topically as active ingredients in ointments, and the like.

The dosage of the present agents, used therapeutically, will vary with the form of administration and the particular compound selected. Furthermore, it will vary with the particular subject under treatment. Generally, treatment is initiated with small dosages, substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of Formula I and their salts of this invention are most desirably administered at a concentration level that will generally afford effective results without causing any harmful or deleterious side effects. When used as antiprotazoal (e.g., trichomonacidal) agents, they can be administered in general at a level that is in the range of from about 5 mg./kg. to about 15 mg./kg. per day, although as mentioned, variations will occur. In general, for this purpose, they can be administered according to regimens established for known trichomonacides, like metronidazole.

Of course, as will be clear to those skilled in the art, in addition to compounds designated by Formula I, the invention broadly comprehends obvious chemical equivalents thereof but differing therefrom merely in the sense of having other functional groups, such as, for example 6- and/or 7-(lower)alkyl, 16-(lower)-alkyl, and the like, attached to the steroid nucleus, whenever such groups do not themselves interfere or become affected during the preparation of the instant compounds, unless, in exceptional instances, this is a desired effect. Broadly stated, therefore useful compounds of this invention would be represented by the formula

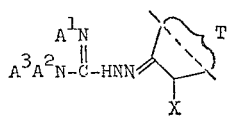

wherein X, $A^1$, $A^2$ and $A^3$ are hereinabove defined and T is a carbon atom arrangement needed to complete a cyclopentanopolyhydrophenanthrene steroid nucleus having a beta-hydroxy or acyloxy group in the 17-position; a (lower)alkyl group in the 13-position; a (lower)alkyl, (lower)alkenyl, (lower)alkynyl, chloroethynyl, 3-hydroxypropynyl or carboxyethynyl group alpha oriented in the 17-position; and hydrogen or methyl in the 10-position, and which exhibit antimicrobial activity.

DESCRIPTION OF THE PREFERRED EMBODIMENTS

The following examples are given by way of illustration and are not to be construed as limitations of this invention, many variations of which are possible without departing from the scope and spirit thereof.

Example 1.—4-chloro-13-ethyl-17α-ethynyl-17-hydroxygon-4-en-3-one, amidinohydrazone and nitrate salt (a) dl - 4ξ,5ξ - epoxido - 13-ethyl-17α-ethynyl-17-hydroxygonan-3-one.—A solution of 5.0 g. of dl-13-ethyl-17α-ethynyl-17-hydroxygon-4-en-3-one in 600 ml. of methanol is cooled to −7° C. and 50 ml. of hydrogen peroxide (30%) is added slowly while stirring. After adding 16 ml. of 10% sodium hydroxide, the temperature was at +8° C. The reaction mixture is cooled to +3° C. for 30 minutes, poured over ice and the precipitate is filtered to give the title compound; M.P., 148–152° C.

(b) dl-4-chloro-13-ethyl - 17α-ethynyl-17-hydroxygon-4-en-3-one.—A solution of 4.0 g. of dl-4ξ,5ξ-epoxy-13-ethyl-17α-ethynyl-17-hydroxygon-3-one, 250 ml. of acetone and 10 ml. of concentrated hydrochloric acid is stirred for two hours. The reaction mixture is diluted with brine and the material extracted with ether. The organic layer is washed with sodium bicarbonate solution. The residue obtained on evaporation of the ether is recrystallized from methanol-water to give 2.4 g. of the title compound, M.P. 169–170° C.

Analysis.—$C_{21}H_{27}ClO_2$ requires: C, 72.71; H, 7.85; Cl, 10.22. Found: C, 72.38; H, 7.57; Cl, 9.91.

(c) dl-4-chloro-13-ethyl-17α-ethynyl-17 - hydroxygon-4-en-3-one, amidinohydrazone, nitrate salt hydrate.—To a solution of 500 mg. of aminoguanidine nitrate in 35 ml. of methanol is added 500 mg. of dl-4-chloro-13-ethyl-17α-ethynyl-17-hydroxygon-4-en-one. After the addition of 2.0 ml. of 7% nitric acid, the reaction mixture is stirred overnight. The volume is reduced to 5 ml. by passing nitrogen over the surface and the resulting material is filtered to give 530 mg. of the title compound; M.P. 270° C. dec.

Analysis.—$C_{22}H_{31}N_4OCl \cdot HNO_3 \cdot H_2O$ requires: C, 54.59; H, 7.08; N, 14.47; Cl 7.32. Found: C, 54.55; H, 7.01; N, 14.50; Cl, 7.71.

The nitric acid addition salt is converted to the free base by suspending it in water, adding an excess of sodium hydroxide solution, extracting the liberated base with ether and evaporating the ether to leave the free base as a residue.

The free base is converted to the corresponding acid addition salts by treating a solution of the base in acetone with stoichiometrical amounts of the respective acid in ethanol, then freeze-drying the mixture to leave the acid addition salt as a residue. In this manner, there are obtained the fumarate, malate, citrate, tartrate, embonate, acetate, hydrochloride, and sulfate.

Example 2.—4-chloro-13,17α-diethyl-17-hydroxygon-4-en-3-one, amidinohydrazone and nitrate salt (a) dl-4ξ,5ξ-epoxide-13,17α-diethyl-17-hydroxygonan-3-one.—A solution of 5.0 g. of dl-13,17α-diethyl-17-hydroxygon-4-en-3-one in 300 ml. of methanol is cooled to 0° C. While stirring, 35 ml. of hydrogen peroxide 30% is added in the course of 10 minutes followed by the addition of 8 ml. of 10% sodium hydroxide solution. After an additional 30 minutes of stirring, the temperature was 4° C. the reaction mixture is poured into water and the resulting precipitate is filtered to give 4.5 g. of the title compound.

Analysis.—$C_{21}H_{32}O_3 \cdot \frac{1}{4}H_2O$ requires: C, 74.90; H, 9.72. Found: C, 74.81; H, 9.72.

(b) dl-4-chloro-13,17α-diethyl - 17 - hydroxygon-4-en-3-one.—A solution of 4.0 g. of dl-4ξ,5ξ-epoxido-13,17α-diethyl-17-hydroxygonan-3-one in 250 ml. of acetone is treated with 10 ml. of concentrated hydrochloric acid. After stirring for 2 hours, the reaction mixture is poured into brine and the organic layer is extracted with ether. The residue obtained on evaporation of the solvent is dissolved in ethyl acetate. On addition of hexane a side product is filtered off and the clear filtrate is evaporated. The residue is treated with a few ml. of ethyl acetate of obtain 1.8 g. of the title compound; M.P. 151–152° C.

Analysis.—$C_{21}H_{31}ClO_2$ requires: C, 71.87; H, 8.91; Cl, 10.10. Found: C, 72.10; H, 8.85; Cl, 10.08.

(c) dl-4-chloro-13,17α-diethyl - 17 - hydroxygon-4-en-3-one, amidinohydrazone, nitrate salt.—To a solution of 500 mg. of aminoguanidine nitrate in 26 ml. of methanol is added 500 mg. of dl-4-chloro-13,17α-diethyl-17-hydroxygon-4-en-3-one and 1 ml. of nitric acid. The reaction mixture is stirred for 30 minutes and after standing for 12 hours, the resulting precipitate is filtered to give 500 mg. of the title compound; M.P. 240° C. (dec.).

Analysis.—$C_{22}H_{35}ClN_4O \cdot HNO_3$ requires: C, 56.33; H, 7.74; N, 14.93; Cl, 7.56. Found: C, 55.90; H, 7.68; N, 15.25; Cl, 7.25.

This compound is converted to the free base and then to the corresponding acid-addition salts by the procedure of Example 1.

Example 3.—4-bromo-13-ethyl-17α-ethynyl-17-hydroxygon-4-en-3-one, amidinohydrazone and nitrate salt (a) dl-4-bromo-13-ethyl-17α-ethynyl-17-hydroxygon-4-en-3-one.—A solution of 4.0 g. of dl-4ξ,5ξ-epoxido-13-ethyl-17α-ethynyl-17-hydroxygonan-3-one in 250 ml. of acetone is treated with 10 ml. of hydrobromic acid (48%). After stirring for 2 hours, the reaction mixture is poured over brine and the organic layer extracted with ether. The solvent is evaporated and the residue recrystallized from ethyl acetate/hexane to give 1.8 g. of the title compound, M.P. 114–115° C.

Analysis.—$C_{21}H_{27}BrO_2$ requires: C, 64.45; H, 6.95; Br, 20.42. Found: C, 64.22; H, 6.75; Br, 20.24.

(b) 4-bromo-13-ethyl-17α-ethynyl-17-hydroxygon-4-en-3-one, amidinohydrazone nitrate salt.—To a solution of 500 mg. of aminoguanidine nitrate in 12 ml. of methanol is added 500 mg. of dl-4-bromo-13-ethyl-17α-ethynyl-17-hydroxygon-4-en-3-one and 1 ml. of nitric acid (7%). The reaction mixture is stirred for 3 hours. After 20 hours of standing at room temperature the product is filtered to yield 500 mg. of the title compound, M.P. 265° C. (dec.).

Analysis.—$C_{22}H_{31}BrN_4O \cdot HNO_3 \cdot H_2O$ requires: C, 49.99; H, 6.48; N, 13.25; Br, 15.12. Found: C, 49.74; H, 6.30; N, 13.24; Br, 15.40.

This compound is converted to the free base and then to the corresponding acid addition salts by the procedure of Example 1.

Example 4.—4-chloro-17β-hydroxy-13,17-dipropylgon-4-en-3-one, amidinohydrazone and nitrate salt (a) *dl*-4ξ,5ξ-epoxido-17β-hydroxy-13,17-dipropylgonan-3-one.—To a solution of 2.0 g. of *dl*-13,17α-dipropyl-17-hydroxygon-4-en-3-one in 120 ml. of methanol is added at —4° C., 10 ml. of hydrogen peroxide in the course of 15 minutes. The temperature rises to +2° C. After adding dropwise 2.4 ml. of 10% sodium hydroxide, the reaction mixture is stirred an additional 30 minutes and poured over ice to give 1.7 g. of the title compound, M.P., 60–70° C., $\lambda_{max.}^{KBr}$ 5.86

(b) *dl*-4-chloro-17β-hydroxy-13,17-dipropylgon-4-en-3-one.—A solution of 1.7 g. of 4ξ,5ξ-epoxy-17β-hydroxy-13,17-dipropylgonan-3-one in 100 ml. of acetone is treated with 5 ml. of concentrated hydrochloric acid for 2 hours. After standing overnight, the reaction mixture is poured over brine. The organic layer is extracted with ether and the material obtained on evaporation of the ether is recrystallized from methanol/water twice to give 750 mg. of the title compound, M.P. 93–99° C.

Analysis.—$C_{23}H_{34}O_2Cl$ requires: C, 73.08; H, 9.06; Cl, 9.38. Found: C, 73.08; H, 8.56; Cl, 10.03.

(c) 4-chloro - 17β - hydroxy - 13,17-dipropylgon-4-en-3-one, amidinohydrazone nitrate salt.—To a solution of 700 mg. amidinoguanidine nitrate, 15 ml. methanol, and 700 mg. of *dl*-4-chloro-17β-hydroxy-13,17-dipropylgon-4-en-3-one is added 1.5 ml. 7% nitric acid. The reaction mixture is stirred overnight and the resulting precipitate filtered to give 700 mg. of the title compound; M.P. 219° C.

Analysis.—$C_{24}H_{39}N_4OCl \cdot HNO_3$ requires: C, 57.87; H, 8.09; N, 14.06; Cl, 7.12. Found: C, 57.95; H, 7.79; N, 14.37; Cl, 7.37.

This compound is converted to the free base and then to the corresponding acid addition salts by the procedure of Example 1.

Example 5.—13-ethyl-17α-ethynyl-4-fluoro-17-hydroxygon-4-en-3-one

To a solution of 2.0 g. of *dl*-4ξ,5ξ-epoxido-13-ethyl-17α-ethynyl-17 hydroxygonan-3-one (Example 1a) in 160 ml. of chloroform cooled to —65° C. is added a solution of 4.5 ml. of tetrahydrofuran and 3.2 ml. of hydrogen fluoride. The reaction mixture is stirred for four hours and allowed to stand at about 22° C. for about 16 hours. It then is poured into 1 liter of 5% potassium carbonate solution and the organic material extracted with chloroform. The residue obtained on evaporation of the solvent is added to 100 ml. of acetic acid which has been saturated with hydrogen chloride. The reaction mixture is kept in a pressure bottle for about 16 hours. After pouring the mixture into cold brine, it is extracted with chloroform and chromatographed over silica gel in benzene/hexane 1:1. Elution with ether, followed by recrystallization of the residue from methanol/water affords the title compound, M.P. 188–190° C.;

$\lambda_{max.}^{KBr}$, 2.96; 3.09; 6.00; 6.10μ

This is converted by the procedure of Example 3, step (b) into 4-fluoro-13-ethyl-17α-ethynyl-17-hydroxygon-4-en-3-one, amidinohydrazone, nitrate salt, which is converted to the free base and then to the corresponding acid addition salts by the procedure of Example I.

Example 6.—4,5-epoxido-13-ethyl-17α-ethylyl-17-hydroxygonan-3-one 13-ethyl-17α-ethynyl-17-hydroxy-gon-4-en-3-one (5.9 g., prepared by the procedure of Example 12 of U.K. Patent No. 1,041,279) in 90 ml. of chloroform and 5.21 g. of m-chloroperbenzoic acid in 168 ml. of chloroform are kept 3 days at 0° C., washed with sodium bicarbonate solution, and the solvents evaporated to leave the product as a residue. It is recrystallized from ethanol, M.P. 148–152° C.

Example 7

The procedures of Examples 1(a) and 6 are repeated, substituting for the 17α-ethyl and 17α-ethynylgon-4-enes, stoichiometrical amounts of correspondingly substituted gon-4-enes. There are obtained the following 4ξ,5ξ-epoxidogonan-3-ones:

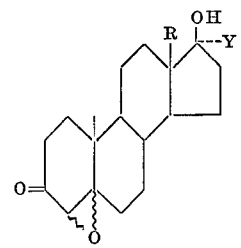

| R | Y |
|---|---|
| $CH_3CH_2$ | $CH_3$ |
| $CH_3CH_2CH_2$ | $CH_3$ |
| $CH_3CH_2CH_2$ | $CH_3CH_2$ |
| $CH_3CH_2$ | $CH_3CH_2CH_2$ |
| $CH_3(CH_2)_2CH_2$ | $CH_3CH_2$ |
| $CH_3CH_2$ | $CH_3C\equiv C$ |
| $CH_3CH_2CH_2$ | $HC\equiv C$ |
| $CH_3CH_2CH_2$ | $CH_3C\equiv C$ |
| $CH_3CH_2CH_2$ | $CH_3CH_2CH_2$ |
| $CH_3(CH_2)_2CH_2$ | $HC\equiv C$ |
| $CH_3CH_2CH_2$ | $ClC\equiv C$ |
| $CH_3CH_2$ | $ClC\equiv C$ |
| $CH_3CH_2$ | $HOCH_2C\equiv C$ |
| $CH_3CH_2$ | $C\equiv CCOOH$ |

Example 8

The procedures of Examples 1–5 are used to (a) epoxidize, (b) halogenate/dehydrate and (c) condense with aminoguanidine nitrate, the following ketosteroids:

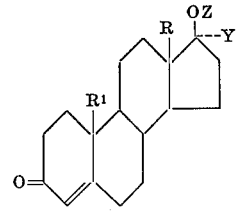

| R | $R^1$ | Y | Z |
|---|---|---|---|
| $CH_3$ | $CH_3$ | $CH_3$ | H |
| $CH_3$ | $CH_3$ | $CH_2CH_3$ | H |
| $CH_3$ | H | $CH_2CH_3$ | H |
| $CH_3$ | H | $CH_3$ | H |
| $CH_3$ | H | $CH_3$ | ⌬–$CH_2CH_2CO$ |
| $CH_3$ | $CH_3$ | $C\equiv CH$ | H |
| $CH_3$ | $CH_3$ | $CH_3$ | $CH_3CO$ |
| $CH_3$ | $CH_3$ | $CH_3$ | ⌬–CO |
| $CH_3$ | H | $CH_3$ | ⌬–CO |
| $CH_3CH_2CH_2$ | H | $CH_3CH_2$ | H |
| $CH_3$ | H | $CH_3$ | HCO |
| $CH_3$ | H | $CH_3$ | $CH_3(CH_2)_6CO$ |
| $CH_3(CH_2)_4CH_2$ | H | $CH_3$ | H |
| $CH_3$ | $CH_3$ | $C\equiv CCH_3$ | H |
| $CH_3$ | $CH_3$ | $C\equiv CCl$ | H |
| $CH_3$ | $CH_3$ | $C\equiv CCH_2OH$ | H |
| $CH_3$ | $CH_3$ | $C\equiv CCO_2H$ | H |

There are obtained the corresponding-substituted nitric acid addition salts of 4-halo-3-keto steroid, amidinohydrazones of the formula:

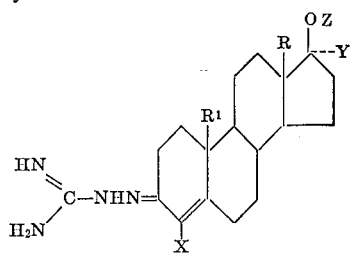

| R | R¹ | X | Y | Z |
|---|---|---|---|---|
| CH₃ | CH₃ | Cl | CH₃ | H |
| CH₃ | CH₃ | Cl | CH₂CH₃ | H |
| CH₃ | H | Br | CH₂CH₃ | H |
| CH₃ | H | F | CH₃ | H |
| CH₃ | H | Cl | CH₃ | 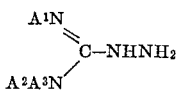—CH₂CH₂CO |
| CH₃ | H | Cl | CH=CH₂ | H |
| CH₃ | CH₃ | Cl | C≡CH | H |
| CH₃ | CH₃ | Cl | CH₃ | CH₃CO |
| CH₃ | CH₃ | Cl | CH₃ | ⟨◯⟩—CO |
| CH₃ | H | F | CH₃ | ⟨◯⟩—CO |
| CH₃ | H | Cl | CH₂(CH₂)₄CH₃ | H |
| CH₃ | H | Cl | CH₃ | HCO |
| CH₃ | H | Cl | CH₃ | CH₃(CH₂)₆CO |
| CH₃(CH₂)₄CH₂ | H | Cl | CH₃ | H |
| CH₃ | CH₃ | Cl | C≡CCH₃ | H |
| CH₃ | CH₃ | Cl | C≡CCl | H |
| CH₃ | CH₃ | Cl | C≡CCH₂OH | H |
| CH₃ | CH₃ | Cl | C≡CCO₂H | H |

These are converted to the free bases by treatment with sodium hydroxide according to the procedure of Example 1.

The free bases are converted, by the procedure of Example 1 to the corresponding fumarate, malate, citrate, tartrate, embonate, acetate, hydrochloride and sulfate acid addition salts.

Example 9

To a hot solution of 1.0 g. of 2-(2-imidazolin-2-yl)-hydrazine hydrochloride in 20 ml. of methanol there is added 1.0 g. of 4 - chloro-13-ethyl-17α-ethynyl-17-hydroxygon-4-en-3-one. After addition of 20 drops of 5.4 N isopropanolic hydrochloric acid, the reaction mixture is stirred for four hours and then chilled to about 5° C. for 48 hours. The precipitated 4-chloro-13-ethyl-17α-ethynyl - 17 - hydroxygon - 4 - en - 3 - one, 2-(2-imidazolin-2-yl)hydrazone, nitrate salt is collected by filtration and dried.

Example 10

The procedure of Example 9 is repeated, substituting for the cyclic aminoguanidine, stoichiometrical amounts of the following aminoguanidines:

$$\begin{array}{c} A^1N \\ \diagdown \\ A^2A^3N \end{array}C-NHNH_2$$

| A¹ | A² | A³ |
|---|---|---|
| H | H | CH₃CH₂ |
| CH₃ | CH₃ | CH₃CH₂ |
| H | CH₃ | CH₃ |
| H | CH₃CH₂CH₂ | CH₃CH₂CH₂ |
| H | H | CH₃CH₂ |
| CH₃ | CH₃CH₂ | CH₃CH₂ |
| H | CH₃CH₂CH₂ | CH₃ |
| H | CH₃CH₂ | CH₃CH₂ |
| H | H | NO₂ |
| H | H | (CH₃)₂NCH₂CH₂ |
| H | H | (CH₃CH₂)₂HCN₂CH₂CH₂ |
| H | H | (CH₃CH₂CH₂)₂NCH₂CH₂ |
| H | H | (CH₃CH₂CH₂CH₂)(CH₃)NCH₂CH₂ |
| H | H | (CH₂)₆NCH₂CH₂ |
| H | CH₃CH₂ | (CH₂)₇NCH₂CH₂ |
| H | H | (CH₂)₈NCH₂CH₂ |
| CH₃ | CH₃ | CH₃ | in the form of their nitric acid addition salts. There are obtained the correspondingly substituted nitric acid addition salts of the ketosteroidal amidinohydrazones of the formula:

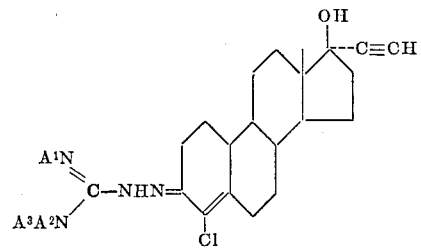

| A¹ | A² | A³ |
|---|---|---|
| H | H | CH₃CH₂ |
| CH₃ | CH₃ | CH₃CH₂ |
| H | CH₃ | CH₃ |
| H | CH₃CH₂CH₂ | CH₃CH₂CH₂ |
| H | H | CH₃CH₂ |
| CH₃ | CH₃CH₂ | CH₃CH₂ |
| H | CH₃CH₂CH₂ | CH₃ |
| H | CH₃CH₂ | CH₃CH₂ |
| H | H | NO₂ |
| H | H | (CH₃)₂NCH₂CH₂ |
| H | H | (CH₃CH₂)₂NCH₂CH₂CH₂ |
| H | H | (CH₃CH₂CH₂)₂NCH₂CH₂ |
| H | H | (CH₃CH₂CH₂CH₂)(CH₃)NCH₂CH₂ |
| H | H | (CH₂)₆NCH₂CH₂ |
| H | CH₃CH₂ | (CH₂)₇NCH₂CH₂ |
| H | H | (CH₂)₈NCH₂CH₂ |
| CH₃ | CH₃ | CH₃ |

Example 11

The condensation procedure of Example 9 is repeated, substituting for the cyclic aminoguanidine, stoichiometrically-equilavent amounts of the substituted aminoguanidines of Example 10, and for the 4-chloro-13-ethyl-17α-ethynyl - 17 - hydroxygon - 4 - en-3-one, stoichiometrical amounts of the corresponding 4-halogon-4-en-3-ones prepared according to Example 8. The correspondingly-substituted nitric acid addition salts of 4-halogon-4-ene-3-one, amidinohydrazones, of this invention, are obtained.

These are converted to the free bases by treatment with sodium hydroxide according to the procedure of Example 1.

The free bases are converted by the procedure of Example 1 to the corresponding fumarate, malate, citrate, tartrate, embonate, acetate, hydrochloride and sulfate acid addition salts.

We claim:
1. A compound of the formula

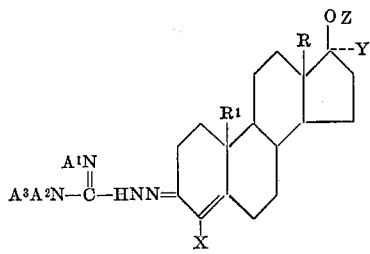

wherein:
R is (lower)alkyl;
$R^1$ is hydrogen or methyl;
X is fluoro, chloro or bromo;
Y is (lower)alkyl, (lower)alkenyl, (lower)alkynyl, chloroethynyl, 3-hydroxypropynyl or carboxyethynyl;
Z is hydrogen, (lower)alkanoyl or benzoyl;
$A^1$ and $A^2$, independently, are hydrogen or (lower) alkyl or, taken together, are —$CH_2CH_2$—; and $A^3$ is hydrogen, nitro, (lower)alkyl, di(lower)alkylamino(lower)alkyl, hexamethyleneimino(lower)alkyl, heptamethyleneimino(lower)alkyl or octamethyleneimino(lower)alkyl, provided however that when $A^1$ and $A^2$ taken together are —$CH_2CH_2$—, $A^3$ is hydrogen, or a pharmaceutically-acceptable acid-addition salt of said compound.

2. A compound as defined in claim 1 which is: 4-chloro-13-ethyl - 17α - ethynyl - 17 - hydroxygon-4-en-3-one; amidinohydrazone.

3. A compound as defined in claim 2 in the form of a monohydrated nitric acid addition salt.

4. A compound as defined in claim 1 which is: 4-chloro-13,17α-diethyl-17-hydroxygon-4-en-3-one, amidinohydrazone.

5. A compound as defined in claim 4 in the form of an addition salt with nitric acid.

6. A compound as defined in claim 1 which is: 4-bromo-13-ethyl - 17α - ethynyl - 17 - hydroxygon-4-en-3-one, amidinohydrazone.

7. A compound as defined in claim 6 in the form of a monohydrated nitric acid addition salt.

8. A compound as defined in claim 1 which is: 4-chloro - 17β - hydroxy - 13,17 - dipropylgon - 4 - en - 3 - one, amidinohydrazone.

9. A compound as defined in claim 8 in the form of an addition salt with nitric acid.

10. A compund of the formula

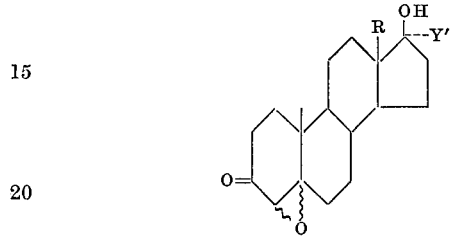

wherein:
R is polycarbonalkyl of from about 2 to about 6 carbon atoms; and
Y' is (lower)alkyl, (lower)alkynyl, chloroethynyl, 3-hydroxypropynyl or carboxyethynyl.

11. A compound as defined in claim 10 which is 4ξ,5ξ-epoxido-13-ethyl-17α-ethynyl-17-hydroxygonan-3-one.

12. A compound as defined in claim 10 which is 4ξ,5ξ-epoxido-13,17α-diethyl-17-hydroxygonan-3-one.

13. A compound as defined in claim 10 which is 4ξ,5ξ-epoxido-17β-hydroxy-13,17-dipropylgonan-3-one.

References Cited

UNITED STATES PATENTS

| | | | |
|---|---|---|---|
| 3,069,414 | 12/1962 | De Ruggieri | 260—239.5 |
| 3,251,863 | 5/1966 | Schuetz et al. | 260—397 |

OTHER REFERENCES

Mancera et al.: Cad. Jour. of Chem., vol. 37 (1959), pp. 1785–87.

HENRY A. FRENCH, Primary Examiner

U.S. Cl. X.R.

260—239.5, 397.1, 397.5, 999